United States Patent
Saunamaki et al.

(10) Patent No.: US 6,597,351 B2
(45) Date of Patent: Jul. 22, 2003

(54) MOBILE COMMUNICATION DEVICE WITH DISPLAY MODE CONTROL

(75) Inventors: Antti Saunamaki, Salo (FI); Kaj Saarinen, Turku (FI)

(73) Assignee: Nokia Mobile Phones Limited, Espoo (FI)

( * ) Notice: Subject to any disclaimer, the term of this patent is extended or adjusted under 35 U.S.C. 154(b) by 168 days.

(21) Appl. No.: 09/736,990

(22) Filed: Dec. 14, 2000

(65) Prior Publication Data

US 2002/0075247 A1 Jun. 20, 2002

(51) Int. Cl.[7] .................................................. G09G 5/00
(52) U.S. Cl. ....................... 345/204; 345/690; 345/589; 345/89
(58) Field of Search .................. 345/147, 89, 690–697, 345/63, 212, 204, 69, 589

(56) References Cited

U.S. PATENT DOCUMENTS 5,757,365 A * 5/1998 Ho
6,353,435 B2 * 3/2002 Kudo et al.
6,396,465 B1 * 5/2002 Nakagiri

* cited by examiner

Primary Examiner—Matthew C. Bella
Assistant Examiner—Hau Nguyen
(74) Attorney, Agent, or Firm—Perman & Green, LLP

(57) ABSTRACT

In the standby or active condition of a mobile communications device, the microprocessor controller of the device is programmed to query the display driver memory for data relating to the characteristics of the image selected for display. If no grayscale or color data is present, the display driver is adjusted to disable shade generation to reduce current consumption.

8 Claims, 3 Drawing Sheets

MOBILE COMMUNICATION DEVICE WITH DISPLAY MODE CONTROL

BACKGROUND OF THE INVENTION

Mobile telephones and similar communication devices are rapidly expanding in use and function. Such devices will soon provide Internet access, personal information management, facsimile, and messaging, in addition to telephone communication. This will require a user interface which is more complex, crowded and generally more difficult to use. As a result, the displays associated with such devices are becoming more sophisticated to accommodate these trends. Newer displays have the capability of presenting grayscale and color images, as well as black and white.

These trends cause ever increasing demands on the power supply and have caused increasing challenges to conserve energy especially during periods of standby mode. For example: black and white images displayed in grayscale mode in some instances could increase current consumption as much as 100% over black and white images which are displayed in black and white mode. A further power consumption premium occurs when color image mode is used.

It would, therefore, be advantageous to avoid shade generation during standby and other modes of operation to reduce current consumption. Automatic switching from shade generation, however, will cause image distortion where the user has selected an image which uses color or grayscale mode, thereby detracting from the functionality of this feature.

It is a purpose of this invention to reduce current consumption in a communications device during standby and active operation by disabling shade generation. It is also a purpose of this invention to accomplish the reduction in current consumption while avoiding the distortion of grayscale or color images.

SUMMARY OF THE INVENTION

In devices having the capability of displaying grayscale, there is an opportunity to conserve energy when such devices are called upon to display black and white. In such devices, shade generation is employed to obtain the various grayscales. In accordance with this invention, a special program is devised which causes the display data to be searched for the data relating to the current image type to be displayed. When the inquiry results indicate that a grayscale or color graphic is selected, no change in the display mode is directed. If however, the current image is in black and white, then the display driver is programmed to disable the shade generation function.

The microprocessor control unit (MCU) of a mobile phone or other similar communications device is generally programmed to control the display driver of the device. To accomplish the purpose of this invention, the energy conservation software is stored in memory for use by the MCU of the communications device to query the display driver data for an indication of the graphics to be displayed. If black and white graphics are to be displayed, the software adjusts the operation of the display driver to avoid shade generation.

In this manner current consumption may be reduced during standby or normal operation while the feature of using grayscale or color images is preserved.

DESCRIPTION OF THE DRAWING

The invention is described in more detail below with reference to the attached drawing in which.

DESCRIPTION OF THE PREFERRED EMBODIMENT

Figure 1:
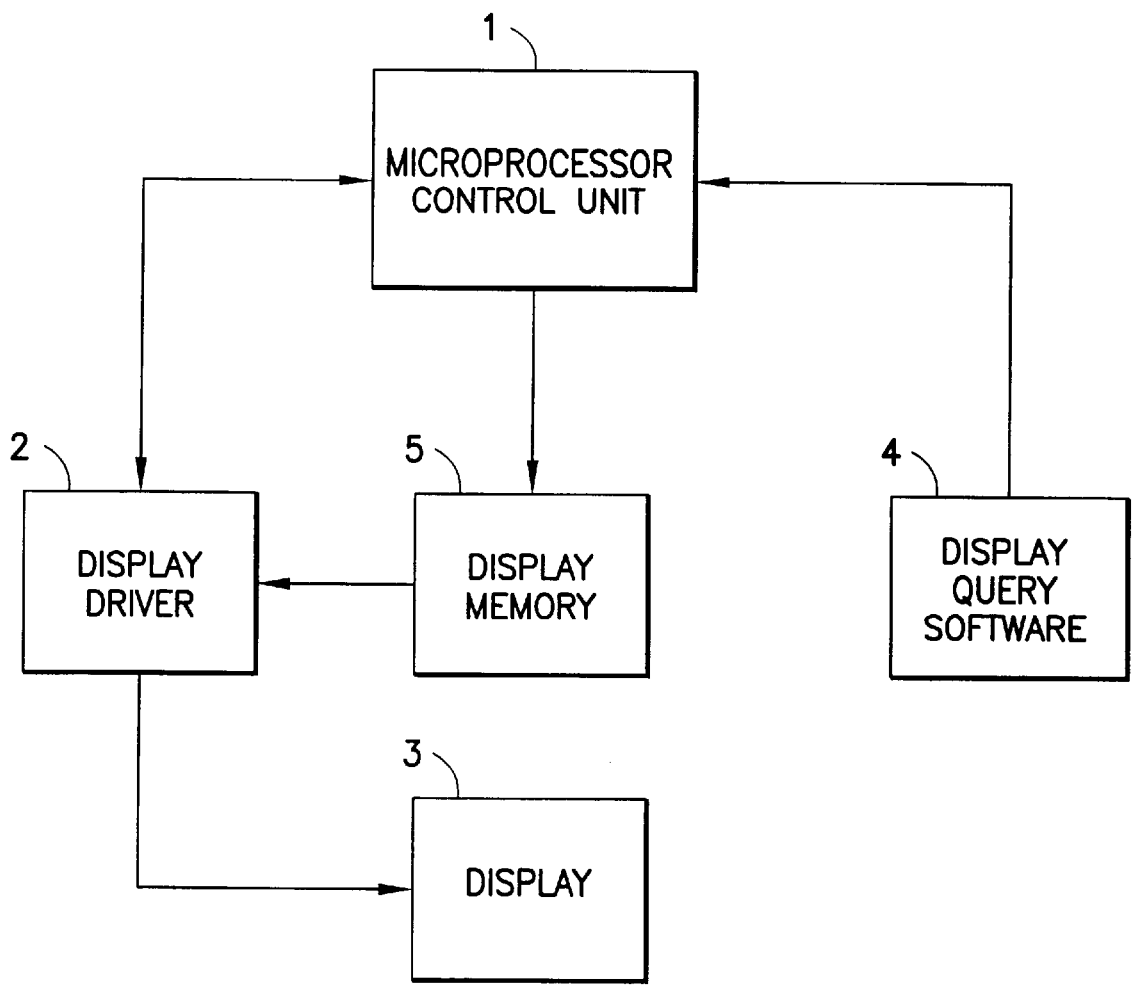
FIG. 1 is a block diagram of the system of this invention.
Figure 2:
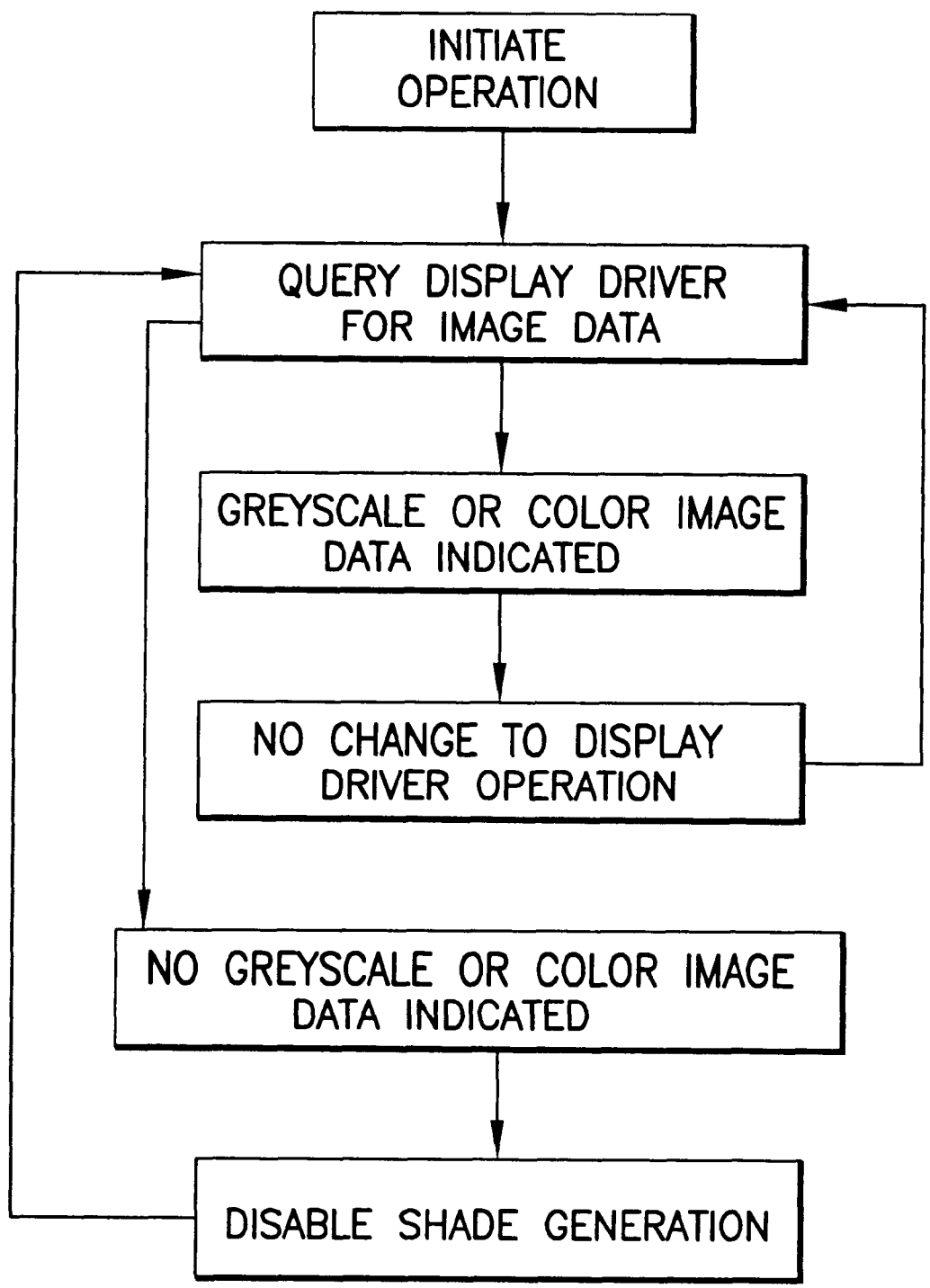
FIG. 2 is a chart of the steps of this invention.

A system for controlling a communication device, such as a mobile phone, pager, personal information manager and the like is shown in part in FIG. 1 and consists of a microprocessor control unit 1 which is connected to a display driver 2. Display driver 2 causes images to appear on the display 3 in response to instructions from the control unit 1. It is assumed for purposes of illustration that the display is capable of displaying grayscale or color graphics. In general this requires the generation of shades of basic colors to provide a wide range of colors or tints. In accordance with this invention a software module 4 is stored in the memory of the mobile phone and is designed to initiate a sequence of steps when the mobile phone is in the standby condition or where general operation is initiated. It should be understood that the system shown in FIG. 1 is for illustration only as the various components shown may form part of one or the other of the components, for example the display driver and display memory may be constructed as part of the microprocessor control. The flow of information and steps, as shown in FIG. 2, will necessarily follow an equivalent path even though the hardware is executed in a single or multiple component configuration.

In accordance with this invention, the microprocessor control unit 1 is designed to adjust the operation of the display driver to disable shade generation upon the occurrence of certain events which are ascertained from an inquiry into the image data stored in memory 5 of display driver 2. In particular when the device is placed in an idle condition or general use is initiated, there is generally displayed a logo or other identifying image which is selected by the user. Such identifying units may operate in a grayscale mode, color mode or a black and white mode. For example in grayscale, these data is in digital form in which 11 would indicate black, 10 dark gray, 01 light gray and 00 is white. The variations of color being created by shade generation. In particular when the device is in the standby condition, but in other stages of operation as well, it is advantageous to adjust the display driver 2 to avoid shade generation in order to reduce current consumption. In the grayscale situation, this effectively limits the graphics to black and white.

Figure 3:
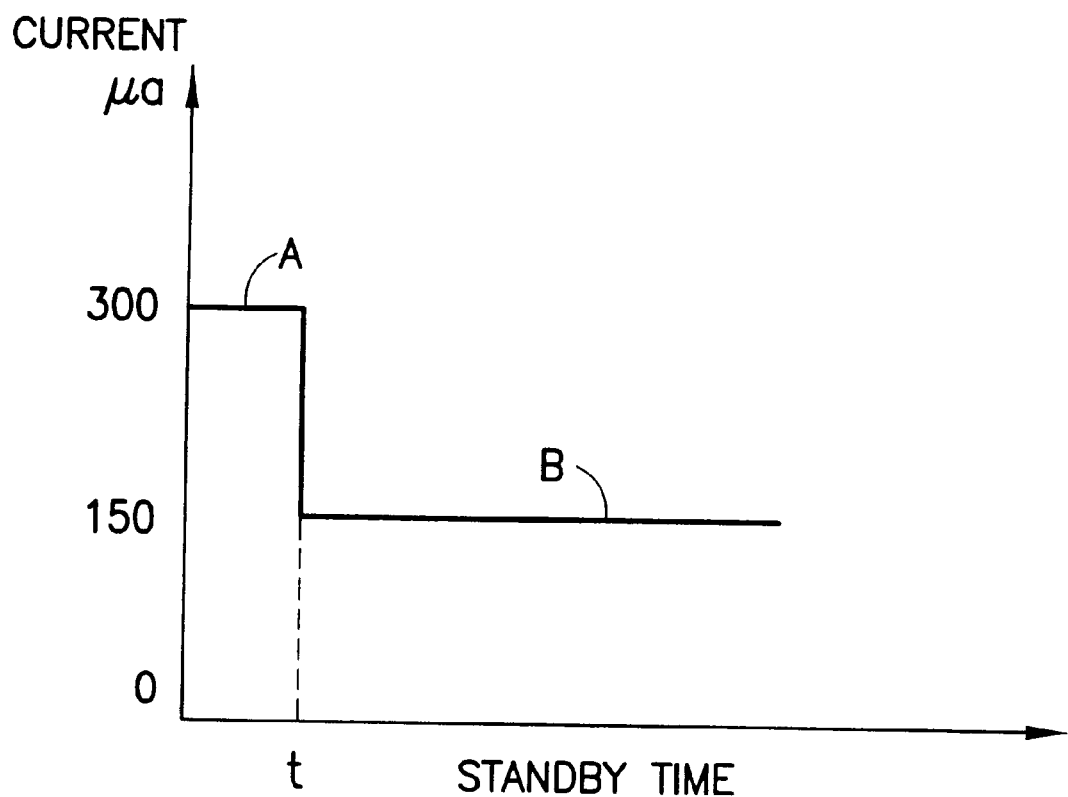
FIG. 3 is a graph of the current consumption illustrating the benefit of this invention.

As shown in the graph of FIG. 3, operation of the display driver in the grayscale mode will cause a current drain of approximately 300 $\mu$a during idle, as shown by line A. Operation of the display driver in black and white mode, for example at time $t_1$ will reduce the current drain to 150 $\mu$a, as shown by line B. Such a conversion, however, is problematical when an image selected for use utilizes grayscale or color.

In accordance with this invention, in the idle or general use mode the microprocessor control unit 1 is driven by the software module 4 to query the display driver memory 5. The query searches for data identifying the image type to be used and in particular whether there is indicated an image requiring grayscale or color mode. For example in devices designed to display grayscale graphics, if neither of the digital bits 10 or 01 is indicated, the software module 4 directs the micro processor 1 to adjust driver 2 to turn off shade generation, i.e. convert to black and white mode.

Where color graphics are provided the display driver data is more complex, but can be easily detected. A similar response would occur if a color image was indicated by the query. In the instance of 512 bit color data for example, each sub pixel of a color is represented by 3 bits i.e., 111, 110, . . . , 001 and 000, wherein 111 and 000 represent the color and a black state and the others represent the shades of the color. When shade generation is disabled the colors are reduced to 8 color states.

The operation of the process of this invention is shown in the block diagram of FIG. 2. Upon the communications device going into standby condition or general operation, an opportunity arises to conserve current consumption to prolong the battery capability. In standby, Microprocessor 1 senses the idle condition and is directed by software module 4 to investigate the idle image data contained in the memory 5 of display driver 2. The query results will indicate if grayscale or color image data is present. In the event that grayscale or color data exits, operation of the display driver 2 is maintained in the gray scale or color modes. When the query results indicate that no grayscale or color image data is present, microprocessor control unit 1 changes the display driver 2 to disable shade generation. In this manner the opportunity for energy conservation is accomplished without interfering with the use of greyscale or color images.

We claim:

1. A mobile communication device, having a display capable of presenting images in grayscale, color or black and white graphics, said display using shade generation to present such graphics, said device comprising:

a control unit for controlling the functions of said mobile communication device;

a display driver for generating images on the display in response to signals from said control unit;

a processor in operative association with said microprocessor control unit for storing and executing a program wherein, said program causes said control unit to search said display driver for data indicative of the use of grayscale or color images and causes said control unit to adjust the operation of said display driver to disable said shade generation when no grayscale or color images are indicated.

2. A mobile communication device, having a display capable of presenting images in grayscale, color, or black and white graphics, said display using shade generation to present such graphics, as described in claim 1, wherein said control unit senses when said device is in standby mode and initiates said search.

3. A mobile communication device, having a display capable of presenting images in grayscale, color or black and white graphics, said display using shade generation to present such graphics, as described in claim 1, said device further comprising a display memory operatively associated with the display driver to store data with respect to images for presentation on the display and wherein said control unit searches said memory for image data.

4. A mobile communication device, having a display capable of presenting images in grayscale, color or black and white graphics, said display using shade generation to present such graphics, as described in claim 1, wherein said control unit is caused to adjust said display driver when neither the data bit 10 nor 01 is present.

5. A mobile communication device, having a display capable of presenting images in grayscale, color or black and white graphics, said display using shade generation to present such graphics, said device having a control unit and a display driver, a method for reducing current usage comprising the steps of:

controlling the functions of said mobile communication device in active and standby conditions;

selectably generating images on the display in either, grayscale, color and black and white modes in response to signals from said control unit in said active and standby conditions;

storing and executing an image data search program;

as directed by said program, searching said display driver for data indicative of the use of grayscale or color images, and adjusting said display driver to disable said shade generation when no grayscale or color images are indicated.

6. A mobile communication device, having a display capable of presenting images in grayscale, color or black and white graphics, said display using shade generation to present such graphics, said device having a control unit and a display driver, a method for reducing current usage, as described in claim 5, further comprising the step of storing image data in a memory operatively associated with said display driver and wherein said step of searching is conducted by searching said memory.

7. A mobile communication device, having a display capable of presenting images in grayscale, color or black and white graphics, said display using shade generation to present such graphics, said device having a control unit and a display driver, a method for reducing current usage, as described in claim 5 wherein the step of adjusting is accomplished when neither the data bit 10 nor the data bit 01 is present.

8. A mobile communication device, having a display capable of presenting images in grayscale, color or black and white graphics, said display using shade generation to present such graphics, said device having a control unit and a display driver, a method for reducing current usage, as described in claim 5, wherein the step of searching said display driver is initiated when said mobile communication device is in the standby condition.

* * * * *